United States Patent [19]
Galanes

[11] Patent Number: 5,348,212
[45] Date of Patent: Sep. 20, 1994

[54] WELDING METHOD FOR ROTATABLE SHAFTS

[75] Inventor: George W. Galanes, Wheaton, Ill.

[73] Assignee: Commonwealth Edison, Chicago, Ill.

[21] Appl. No.: 181,992

[22] Filed: Jan. 14, 1994

Related U.S. Application Data

[63] Continuation-in-part of Ser. No. 957,225, Oct. 6, 1992, Pat. No. 5,280,849.

[51] Int. Cl.$^5$ .............................................. B23K 31/02
[52] U.S. Cl. .................... 228/135; 228/169; 228/225; 228/262.41; 228/232; 219/61; 219/76.1; 219/146.1
[58] Field of Search ............... 228/135, 168, 169, 225, 228/231, 232, 262.4, 262.41; 219/61, 76.1, 146.1

[56] References Cited

U.S. PATENT DOCUMENTS

| | | | |
|---|---|---|---|
| 2,276,190 | 3/1942 | Gunnert | 228/234.1 |
| 3,805,372 | 4/1974 | Wagenknecht | 228/225 |
| 4,208,003 | 6/1980 | Meylan | 228/189 |
| 4,426,565 | 1/1984 | Rüter | 228/105 |
| 4,503,129 | 3/1985 | Okuda et al. | 428/562 |
| 4,581,816 | 4/1986 | Klufas et al. | 228/103 |
| 4,633,554 | 1/1987 | Clark et al. | 228/119 |
| 4,896,814 | 1/1990 | Allain et al. | 228/119 |
| 4,897,519 | 1/1990 | Clark et al. | 219/76.14 |
| 4,903,888 | 2/1990 | Clark et al. | 228/119 |
| 4,994,647 | 2/1991 | Tanaka et al. | 219/146.23 |
| 5,049,716 | 9/1991 | Dunmire et al. | 219/76.14 |

FOREIGN PATENT DOCUMENTS 56-163091 12/1981 Japan .................................. 228/119

OTHER PUBLICATIONS

Article-"Weldability Studies In Cr-Mo-V Turbine Rotor Steel", by Kim et al., *Journal Of Materials Engineering*, vol. 10, No. 2, 1988.
Article—"Preheating For Welding", *The Welding Journal*, Apr., 1977.
U.S. Application 06/727,175, filed Apr. 25, 1985, pp. 1-9, incorporated by reference in U.S. Pat. No. 4,633,554.
Article-"Filler Metal Evaluation For Weld Repairing CrMoV Steel HP Rotors", presented at ASME International Joint Power Generating Conference, Oct. 6–10, 1991.

*Primary Examiner*—Samuel M. Heinrich
*Attorney, Agent, or Firm*—Willian Brinks Hofer Gilson & Lione

[57] ABSTRACT

An improved welding method is provided for repairing broken rotors. The welding method preferably employs a 2.25Cr-1.0Mo-0.3V-type filler metal, preferably deposited using a narrow groove welding technique. The broken pieces are aligned end to end. A narrow groove is formed to substantially remove the end surfaces. The groove is preheated, filled with the welding filler metal, and postheated, resulting in a strong, high temperature resistant, long lasting weld.

36 Claims, 2 Drawing Sheets

WELDING METHOD FOR ROTATABLE SHAFTS

RELATED APPLICATION

This application is a continuation-in-part of U.S. application Ser. No. 07/957,225, filed on Oct. 6, 1992, which will issue as U.S. Pat. No. 5,280,849, the entire disclosure of which is incorporated herein by reference.

FIELD OF THE INVENTION

This invention relates to a welding method for repairing rotatable shafts, particularly broken high pressure steam turbine rotors.

BACKGROUND OF THE INVENTION

Large rotating shafts are used in many applications, such as turbines, fans, and pumps. Their use in turbines and for engaging turbines with pumps (for example, boiler feed pumps) often exposes them to environments and load cycling which can lead to cracking, shearing and breaking. Examples of use in the electric utility industry are high and intermediate pressure steam turbines, boiler feed pump turbines, and gas turbines.

High and intermediate pressure steam turbines are commonly used by modern electric utility companies for the purpose of driving generators to produce electric power. Turbines are also used to drive pumps, such as boiler feed pumps. In order to operate safely and effectively, the components of the steam turbines and boiler feed pumps, including the rotors, discs, blades, stationary diaphragms, and boiler feed pump coupling shafts, are typically fabricated from heavy structural alloy steels of the chromium-molybdenum type. The high pressure steam turbines generally operate at temperatures higher than about 500°, however, certain components of the steam turbine are exposed to even higher operating temperatures. The hottest component of a steam turbine is typically the first stage of the rotor. During normal operation, sections of the rotor are typically exposed to temperatures higher than 850° F., are often exposed to temperatures about 900° F., and can be exposed to temperatures as high as 1050° F.

In addition to high temperature, steam turbine rotors and other rotors (for example, coupling shafts leading to turbine driven or motor driven boiler feed pumps) are susceptible to mechanical stresses resulting from vibration, misalignment, or defects in their construction or fabricating material. These mechanical stresses can also lead to cracking or breakage of the rotors.

The useful life of the various steel-fabricated components depends heavily on the thermal and mechanical stresses endured by the components. Because the rotors are typically exposed to much higher temperatures than the other components, the rotors tend to be susceptible to creep damage. In particular, the high temperature regions of the high pressure steam turbine rotors have increased susceptibility to cracking or breakage due to long-term thermal fatigue and creep from power plant load cycling. Similar damage, such as gouging, can occur from mechanical interference between the rotor and stationary components. In the past, the damaged or broken rotor components have simply been replaced. However, replacement of the rotors requires very high capital costs and very long lead times for procurement.

An alternative approach which has been used is to discard the entire section of the rotor which is exposed to temperatures above 850° F., including an appropriate portion surrounding the high temperature region, and replacing the discarded section with a new forging that can be welded to the remaining portion of the older rotor in a lower temperature region. In order for this approach to be successful, the replaced section of the rotor must be large enough to include not only the cracked or broken part of the high temperature region, but the entire high temperature region (i.e., above 850° F.) and enough of the surrounding region that the weld can be made in an area where the operating temperature does not exceed about 850° F. This conventional welding approach includes the use of a filler metal which cannot withstand prolonged exposure to temperatures higher than about 850° F.

The filler metal used in the above-mentioned conventional welding approach is composed of about 0.12 weight percent C, 0.4–0.7 weight percent Mn, 0.4–0.7 weight percent Si, 0.025 weight percent P, 0.025 weight percent S, 0.20 weight percent Ni, 2.3–2.7 weight percent Cr, and 0.9–1.2 weight percent Mo. This conventional filler metal is commonly known as a 2¼ CR-1Mo filler metal. The disadvantage of the conventional welding approach is that it can represent an expensive repair program. Also, long lead times are often required for procurement of the replacement forgings.

Methods of repair in which a wide groove is machined in the rotor shaft to remove a crack and the groove is filled with weld metal are well known in the art. The wide groove may be semi-circular with a radius deep enough to fully remove the crack, or may be machined with straight walls and a large angle of greater than 24 degrees between opposing walls. The wide groove method requires a large amount of weld filler metal, increasing the welding time and chance of distortion. The large weld area also increases the chance of weld defects.

Various other welding filler metals are also known in the art for different high temperature applications. U.S. Pat. No. 4,994,647, issued to Tanaka et al., discloses welding deposit materials intended for use in high temperature applications (e.g., 482° C. or 900° F.). The disclosed uses are boilers, pressure vessels and chemical reactors. The reference teaches that 2.25–3% Cr-1% Mo steels are unsatisfactory for application to pressure vessels which are used under such high temperature and pressure conditions, such as required in a coal liquefaction plant. However, increased strength and increased resistance to hydrogen attack are imparted by adding V and Nb to the covered electrode.

U.S. Pat. No. 4,503,129, issued to Okuda et al., discloses a shielded metal arc welding electrode for chromium-molybdenum low alloy steels. The reference states that chromium-molybdenum low alloy steels, including 2.25Cr-1Mo steel, are widely applied industrially as materials of high heat resistance in the fields of boilers of high temperature and pressure, petroleum industry, synthetic chemistry, and for uses requiring resistance to hydrogen of high temperature and pressure. The reference discloses a welding core wire and/or flux containing chromium and molybdenum, as well as carbon, manganese, silicon, aluminum, nitrogen and nickel. The reference further discloses that at least one element selected from vanadium, titanium, niobium and boron, can be added to the welding flux and/or the core wire to improve high temperature strength.

An article by Kim, et al. entitled "Weldability Studies In Cr-Mo-V Turbine Rotor Steel", *Journal Of Materials Engineering*, Vol. 10, No. 2, 1988, discusses a study undertaken to establish the weldability of a high pressure steam turbine rotor constructed using 1.0Cr-1.0Mo-0.25V steel. The reference discusses the performance of a post weld stress relief heat treatment to prevent cracking of the weld zone during subsequent exposure to elevated temperature service, and to restore its notch toughness. The reference discloses that a 2.25Cr-1Mo filler wire was used in the production of welds. After welding, and heat treatment, impact tests were performed on the weld specimens. The article concluded that postweld heat treatment at 1050° F., caused a reduction in impact properties. On the other hand, postweld heat treatment at 1250° F. caused some improvement in impact properties.

U.S. Pat. No. 4,897,519, issued to Clark et al., discloses a method for repairing worn surfaces of Cr-Mo-V steam turbine components which focuses on the use of a ferrous welding metal including about 4.00 to 19.0 weight percent chromium, 0.43 to 2.1 weight percent molybdenum, 0.09 to 0.5 weight percent vanadium, 0.03 to 0.20 weight percent niobium, 0.0 to 0.08 weight percent aluminum, 0.0 to 0.20 weight percent copper, 0.005 to 0.06 weight percent nitrogen, 0.04 to 0.22 weight percent carbon, 0.15 to 1.0 weight percent manganese, 0.15 to 1.0 weight percent silicon, 0.0 to 0.2 weight percent phosphorous, 0.0 to 0.016 weight percent sulfur, 0.0 to 0.8 weight percent nickel, and the balance iron. The alloy is welded to the worn surface of the turbine component using gas tungsten arc welding, plasma arc welding, electron beam welding, laser beam welding, or gas metal arc welding. The disclosed method is for repairing worn surfaces and no mention is made of repairing rotor shaft cracks.

U.S. Pat. No. 4,903,888, issued to Clark et al., is also directed toward a method for repairing worn surfaces of turbine rotors, including high pressure turbine rotors. A first layer of weld metal is deposited on a worn surface of a turbine component. Then, a second layer of weld metal is deposited over the first layer, using a higher application (weld heat input) temperature, for tempering at least part of the heat-affected zone created in the base metal by the depositing of the first layer.

U.S. Pat. No. 5,049,716, issued to Dunmire et al., discloses methods for providing erosion resistant surfaces to carbon steel turbine components. The surface is welded with a first weldment including steel having at least 12 weight percent chromium. The weldment is deposited on the carbon steel surface at a high rate of welding speed of about 24–52 inches per minute, in a first pass thickness of less than about 0.1 inches.

There is a demand among electric power utilities for a welding method which can be used to repair broken rotors without requiring extensive down time, capital expenditure, or replacement of rotor sections. It is important that the repair weld be able to meet or exceed the mechanical properties of the rotor base material, during and after long-term exposure to temperatures up to and including the range of about 850° F. to about 1050° F. It is believed that such a welding method could extend the operating life of the rotors for an additional 10 to 20 years, resulting in savings of millions of dollars to electric utility companies.

SUMMARY OF THE INVENTION

The present invention is directed to an improved welding method for repairing broken rotor shafts. The method can be used to join any two segments of adjacent shaft together, including the joining of two broken segments, the joining of one broken segment with a new segment, or the joining of two new segments. The improved welding method includes two aspects, a specific welding material and a specific welding procedure.

The welding material is a ferrous-based filler metal including about 1.75–2.75 weight percent chromium, about 0.6–1.4 weight percent molybdenum, and about 0.2–0.4 weight percent vanadium. The most preferred welding material includes about 2.25 weight percent chromium, about 1.0 weight percent molybdenum, and about 0.3 weight percent vanadium. The most preferred welding material can be described, in common terms, as a 2.25Cr-1.0Mo-0.3V filler metal.

The repair process involves, first, aligning and joining the two segments end-to-end. The joined segments should be supported so that their alignment is maintained during welding. This can be accomplished by drilling a small pilot hole in the center of the end of one segment and forming or placing a corresponding pilot stub at the center of the end of the other segment. When the segments are joined together, the pilot stub fits inside the pilot hole so that the resulting alignment cannot be varied.

Next, an excavation or groove is formed between the two segments. This can be accomplished by machining the ends of the segments that are being joined. This machining can be accomplished before or after the segments are aligned and positioned end-to-end, but is usually more easily accomplished after the segments are so aligned and positioned. The excavation or groove need be no wider than necessary to completely remove the damage to the shaft segments caused by the breakage, but should be slightly wider at the top than at the bottom, so that the walls of the groove rise at an angle of about two to three degrees from its center line. The groove should be as deep as possible without disrupting the alignment of the shaft, and may approach, or come close to, the location of the pilot hole and corresponding pilot stub.

Next, the groove is filled using a narrow groove automatic welding process. A suitable narrow groove process is the automatic gas tungsten arc welding (GTAW) process. The welding process includes a heating step, a welding step which includes enough passes to fill the groove with the filler metal, and a post weld heat treatment step.

Optimum techniques are described herein which can be used to repair breaks occurring in even the highest temperature regions of high pressure steam turbine rotors, and other rotors, by forming a weld whose thermal and mechanical properties match or exceed the properties of the rotor base material. Using the techniques described herein, the life of a high pressure steam turbine rotor or other rotor can be significantly extended by weld repair if breaking occurs, with full confidence in the suitability of the weld for extended service.

With the foregoing in mind, it is a feature and advantage of the invention to provide an improved method for repairing broken rotors, including high pressure steam turbine rotors, which allows the rotors to be repaired without replacing sections of the rotor shafts.

It is also a feature and advantage of the invention to provide an improved method for repairing broken rotors, which can be used to repair even the highest temperature sections of the rotors and which provides a weld that withstands prolonged exposure to temperatures as high as 850° F. to 1050° F.

It is also a feature and advantage of the invention to provide an improved method for repairing broken rotors, which significantly reduces the expense and down time needed to complete the repair.

It is also a feature and advantage of the invention to provide an improved method for repairing broken rotors, which reduces the size of the weld repair, reduces the amount of filler metal, reduces the welding time by about 3 to 4 times, decreases the chance of distortion, and reduces the chance of weld defects, as compared to conventional welding processes.

These and other features and advantages of the invention will become further apparent from the following detailed description of the presently preferred embodiments, when read in conjunction with the accompanying figures. The detailed description and figures are to be construed as illustrative rather than limiting, with the scope of the invention being defined by the appended claims and equivalents thereof.

DETAILED DESCRIPTION OF THE PRESENTLY PREFERRED EMBODIMENTS

The method of the present invention is especially useful for repairing broken rotating shafts fabricated from chromium-molybdenum type steels. More specifically, the rotors may be fabricated from ASTM A470 Class 3 or 7 or 8 material.

Class 3 steel includes a maximum of 0.28% by weight carbon, 0.20-0.60% by weight manganese, a maximum of 0.012% by weight phosphorous, a maximum of 0.015% by weight sulfur, 0.15-0.30% by weight silicon, a maximum of 0.75% by weight chromium, a minimum of 0.25% by weight molybdenum, a minimum of 2.50% by weight nickel, a minimum of 0.03% by weight vanadium, and a balance substantially of iron.

Class 7 steel includes a maximum of 0.28% by weight carbon, 0.20-0.60% by weight manganese, a maximum of 0.012% by weight phosphorus, a maximum of 0.015% by weight sulfur, a maximum of 0.10% by weight silicon, 3.25-4.00% by weight nickel, 1.25-2.00% by weight chromium, 0.25-0.60% by weight molybdenum, 0.05-0.15% by weight vanadium, and the balance substantially of iron. The Class 7 steel can be referred to, in common terms, as a 1.25-2.00Cr-0.25-0.60Mo-0.05-0.15V-type steel.

Class 8 steel includes 0.25-0.35% by weight carbon, a maximum of 1.00% by weight manganese, a maximum of 0.012% by weight phosphorous, a maximum of 0.015% by weight sulfur, 0.15-0.35% by weight silicon, a maximum of 0.75% by weight nickel, 1.05-1.50% by weight chromium, 1.00-1.50% by weight molybdenum, 0.20-0.30% by weight vanadium, and the balance substantially of iron. The Class 8 steel can be referred to, in common terms, as a 1.05-1.50Cr-1.00-1.50Mo-0.20-0.30V-type steel.

Figure 1:
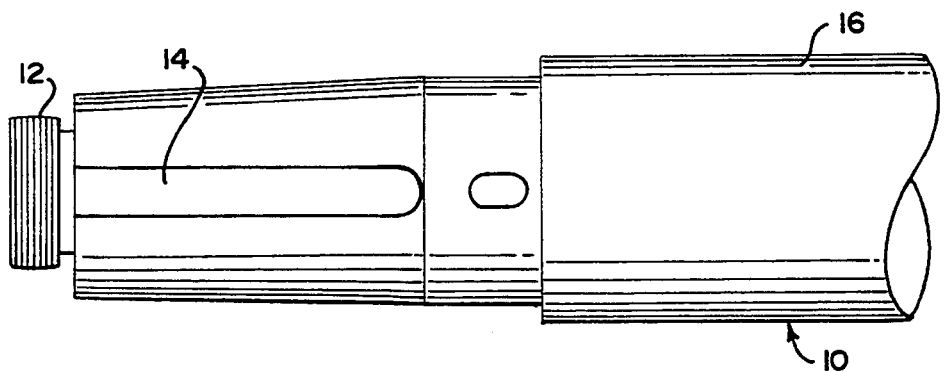
FIG. 1 is a side view of a segment of a rotating shaft.

FIG. 1 illustrates one example of a rotor shaft segment 10. The shaft segment 10 is a portion of a rotor shaft which connects a high pressure steam turbine rotor to a boiler feed pump. The threaded portion 12 and the elongated keyway 14 of the shaft segment 10 are adapted for connection to a boiler feed pump. The wider portion 16 of the shaft segment 10 is the end portion of a shaft leading to a turbine rotor.

Figure 2:
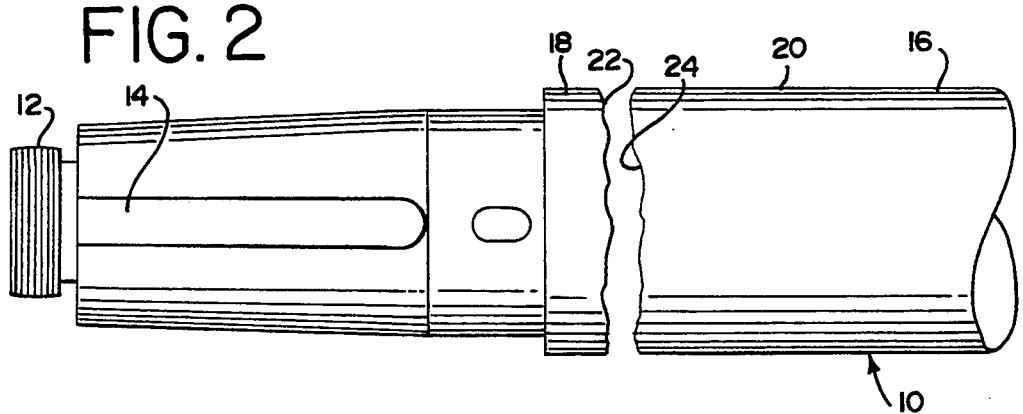
FIG. 2 is the shaft segment of FIG. 1, broken into two pieces.

FIG. 2 illustrates the shaft segment 10 after it has been sheared (i.e. broken) into two pieces 18 and 20 at the location of the damaged ends 22 and 24. The breakage may have been caused by high temperature fatigue and/or mechanical stresses resulting from vibration, misalignment or defects in the construction material. The breakage may have begun as one or more cracks which gradually propagated via a fatigue and creep mechanism.

Figure 3:
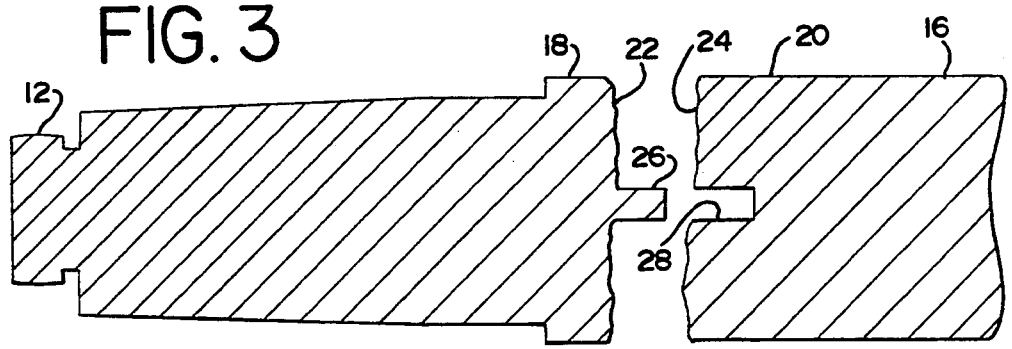
FIG. 3 is a sectional view of the broken shaft of FIG. 2, with a pilot stub welded to the middle of one of the pieces and a corresponding pilot hole machined in the middle of the other piece.

Referring to FIG. 3, the repair is initiated by, first, attaching a pilot stub 26 to the center of the damaged end 22 of the first broken piece 18. The pilot stub 26 may be attached via a standard welding method, may project outward from the end 22 by a distance of about one inch, and may have a diameter of about one-half inch, for a shaft having a diameter of about six inches. A corresponding pilot hole 28 is drilled or otherwise formed in the opposing damaged end 24 of the second piece 20. The pilot hole 28 should have depth and diameter sufficient to completely accommodate the pilot stub 26 when the ends 22 and 24 are joined together, and to provide a snug fit for the pilot stub 26 sufficient to align the pieces 18 and 20, with their opposing end surfaces 22 and 24 facing each other. For example, the pilot hole 28 may be about one-sixteenth of an inch wider, and about one-sixteenth of an inch deeper, than the corresponding dimensions of the pilot stub 26.

Variations in the procedure illustrated in FIG. 3 may also be followed. For example, the pilot stub 26 may instead be attached to the damaged surface 24, and the pilot hole 28 formed in the damaged surface 22. Also, one of the broken shaft pieces 18 or 20 may be discarded and replaced with a new shaft piece, whereby the pilot stub or hole may then be formed in the new shaft piece.

Figure 4:
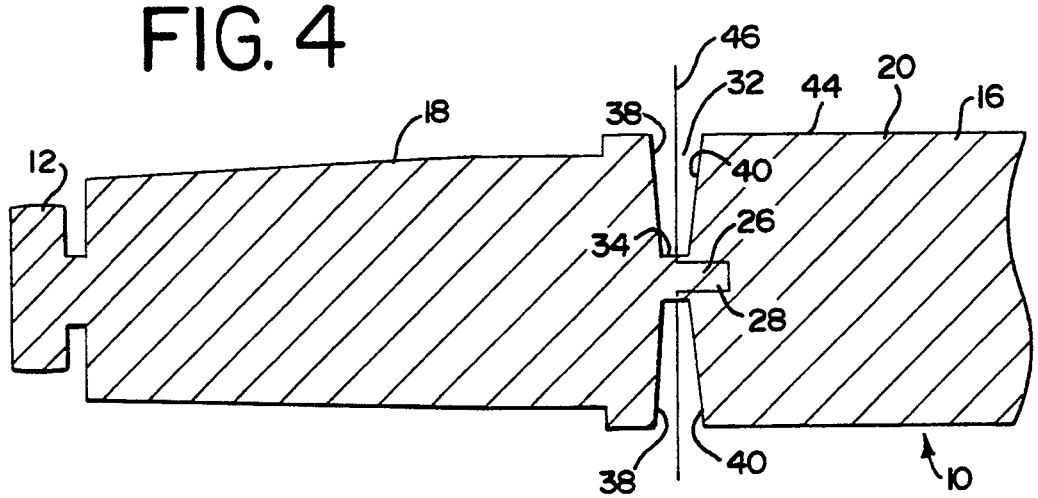
FIG. 4 illustrates the broken shaft of FIG. 3 after the pieces have been joined and a narrow angle groove has been machined.
Figure 5:
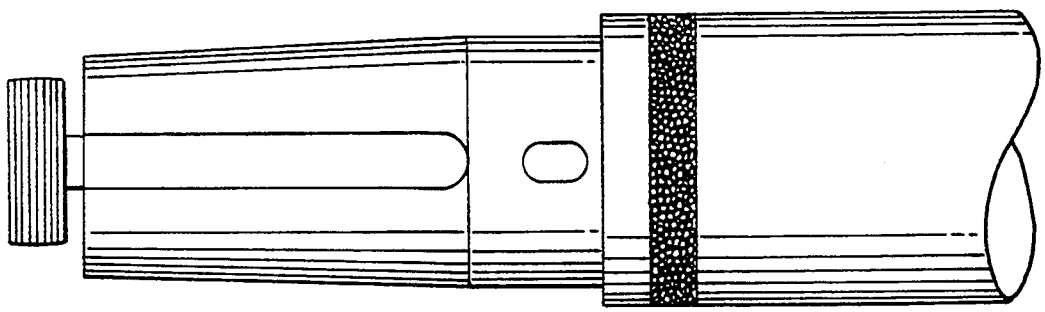
FIG. 5 illustrates the rotating shaft of FIGS. 2-4 after the repair has been completed.

Next, the broken pieces 18 and 20 are joined together by positioning them end to end and pressing and fitting the pilot stub 26 inside the pilot hole 28, as shown in FIG. 4. Several tack welds may be applied to the pilot stub 26 and/or the pilot hole 28 to facilitate a firm and tight bonding between them.

The next step is to remove the damaged end surfaces 22 and 24 from the shaft pieces 16 and 18, to a depth which approaches the junction between the pilot stub 26 and the pilot hole 28. As shown in FIG. 4, this can be accomplished by machining a narrow groove 32 in the rotor shaft 10. The groove 32 can be machined using a lathe or portable fly cutter. The groove 32 should be wide enough, deep enough and long enough to completely or substantially remove the damaged surfaces 22 and 24 of the rotor shaft 10. However, the groove 32 should preferably have a depth of no more than about four inches, in order to facilitate ease of welding, and should not affect the pilot stub or pilot hole.

The groove 32 should extend 360 degrees circumferentially around the rotor shaft 10. One purpose of forming the groove 360 degrees circumferentially around the rotor shaft is to allow the welding filler metal to be deposited continuously in the groove 32 about the circumference of the rotor shaft 10, until the groove 32 is full. The groove 32 should be machined so as to have a floor 34, and two side walls 38 and 40 which rise at angles of less than about five degrees, and preferably about two to three degrees from an imaginary center line 46 which bisects the groove 32 and is perpendicular to the floor 34 and the outer surface 44 of the rotor shaft 10.

The slightly angular configuration of the groove 32 causes the groove 32 to have a semi-trapezoidal cross-section as shown in FIG. 4, such that the distance between the walls 38 and 40 of the groove 32 is slightly greater at the outer surface 44 of the rotor shaft 10 than at the floor 34 of the groove 32. This geometry of the groove 32 is ideal for filling using the narrow groove automatic welding technique described below. Overall, the groove 32 should be no wider than is necessary to remove the end surfaces 22 and 24. For instance, a width of 0.25 inches measured at the floor 34 of the groove 32 is adequate for the removal of most end surfaces, with a slightly higher width occurring at the top of the groove 32 due to the slanting of the walls 38 and 40.

Figure 6:
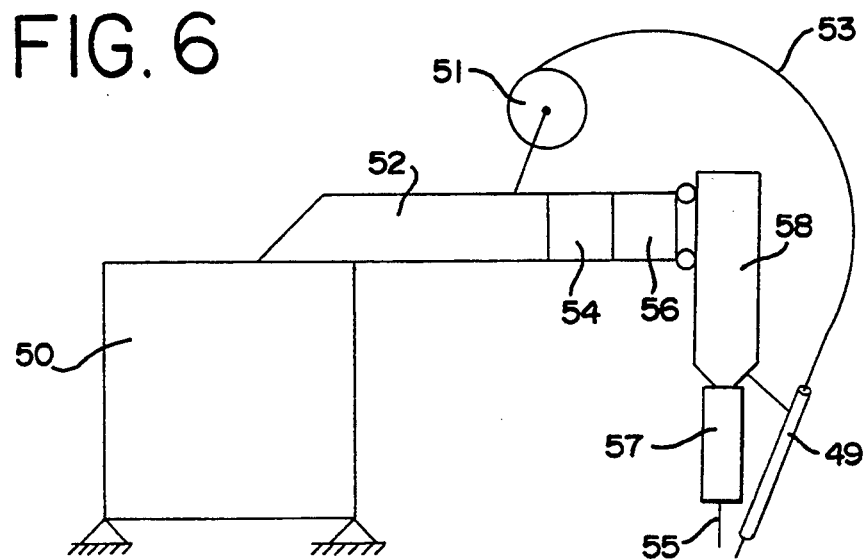
FIG. 6 shows a welding apparatus that may be used to practice the method of the invention.

The GTAW apparatus typically used to perform the narrow groove weld repair is shown in FIG. 6. A stand 50 containing an electric supply is attached to a support arm 52. The support arm 52 holds a sync-pulse unit 54 and an (x, y, z) manipulator 56, which provides the oscillatory motion for the GTAW torch 58. The GTAW torch 58 supplies an argon purge through the protective sock 57 and holds the tungsten electrode 55. The filler metal wire 53 is fed from a supply feeder 51 which is attached to the support arm 52. The filler metal wire passes through a guide tube 49 to place it in proximity with the tungsten electrode 55. The tips of the filler metal wire and the tungsten electrode 55 are inserted in the groove 32 to perform the weld.

For a rotating shaft made of Class 3, Class 7 or Class 8 steel, described above, the welding material is preferably a ferrous-based filler metal including about 1.75-2.75 weight percent chromium, about 0.6-1.4 weight percent molybdenum, and about 0.2-0.4 weight percent vanadium. Preferably, the welding material should include about 2.0-2.5 weight percent chromium, about 0.8-1.2 weight percent molybdenum, and about 0.25-0.35 weight percent vanadium. Most preferably, the welding material will include about 2.25 weight percent chromium, about 1.0 weight percent molybdenum, and about 0.3 weight percent vanadium.

In addition to the foregoing, the welding filler metal may contain about 0.05-0.15 weight percent carbon, about 0.5-0.7 weight percent manganese, about 0.10-0.30 weight percent silicon, about 0.005-0.010 weight percent phosphorous, and about 0.001-0.005 weight percent sulfur, with the balance being substantially iron. One welding material which is particularly suitable for use with the method of the invention is a 2.25Cr-1Mo-0.3V filler metal available from Kawasaki of Japan. A typical lot of the Kawasaki filler metal was found to contain 0.12 weight percent carbon, 0.56 weight percent manganese, 0.10 weight percent silicon, 2.48 weight percent chromium, 0.48 weight percent molybdenum, 0.26 weight percent vanadium, 0.010 weight percent phosphorous, 0.003 weight percent sulfur, and a balance of iron.

Prior to welding, the end regions of the shaft pieces being joined are preferably preheated to a temperature of about 400° to about 600° F., most preferably about 500° F. The purpose of the preheating step is to limit the rate of cooling in the weld zone during the welding process. The welding is then carried out using a narrow groove welding process. The advantages of using a narrow groove welding process include minimization of the amount of weld filler metal being deposited, and minimization of the amount of residual stress in the deposited filler metal resulting in less shrinkage or distortion of the deposited filler metal. The weld surface is preferably clean, with no debris, oil, or other residue.

The welding is preferably carried out in a lathe with the rotor being maintained in the horizontal position. The reason for this is to allow use of conventional machining and welding equipment. The preferred narrow groove welding process is the automatic gas tungsten arc welding process, commonly known as the GTAW process. The preferred welding conditions are as follows:

TABLE 1

| WELDING CONDITIONS FOR GTAW PROCESS | | |
|---|---|---|
| Parameter | General | Preferred |
| Interpass temperature | 500-700° F. | 600° F. |
| Travel speed of welding head | 1-3 in/min. | 1.5-2.0 in./min. |
| Feed rate of filler metal wire | 18-22 in/min. | 20 in./min. |
| Thickness of filler metal wire | 0.040-0.045 in. | 0.045 in. |
| Voltage | 9-11 volts | 9.5 volts |
| Amperage at sidewalls | 240-250 amps | 245 amps |
| Amperage between sidewalls | 140-150 amps | 145 amps |
| Type of current | sync-pulse | sync-pulse |
| Frequency of pulse | 60-62 cycles/sec. | 60 cycles/sec. |
| Tungsten diameter | 1/16-1/8 inch | 1/8 inch |
| Tungsten stickout | 2-4 inch | 4 inch |
| Type of travel | weave | weave |
| Oscillation amplitude | 0.05-0.100 inch | 0.100 inch |
| Primary shield | welding grade | 100% argon |
| Trail shield | welding grade | 100% argon |

The welding can be continued for as many passes as are necessary to fill the groove 32 with weld filler metal. After the welding is completed, the welded filled groove of the turbine rotor shaft, and the surrounding heat affected areas, are preferably baked and postheated. The baking can occur at a temperature of about 500°-600° F., preferably about 550° F., for a period of about one hour. Then, the postheating can occur at a temperature of about 1100° to about 1300° F., for a period of about 4 to about 10 hours. Most preferably, the postheating is carried out at about 1200° F. for about eight hours. The purposes of the post weld heat treatment are to reduce the stresses in the weld and to temper the weld and the surrounding heat affected areas of the turbine rotor shaft.

The postheating is preferably accomplished with the turbine rotor in the vertical position. The reason for this is to minimize radial distortion to the rotor shaft. Preferably, the temperature of the welded filled groove of the turbine rotor shaft and surrounding areas is gradually increased at a rate of about 125° F. per hour, for a period of about 5–6 hours, until the post weld heat treatment temperature is reached. Then, after postheating for about four hours, the temperature is lowered at a rate of about 125° F. per hour for a period of about 10–20 hours, until the temperature falls below about 500° F.

While the embodiments of the invention disclosed herein are presently considered to be preferred, various modifications and improvements can be made without departing from the spirit and scope of the invention. The scope of the invention is indicated in the appended claims, and all changes that come within the meaning and range of equivalency of the claims are intended to be embraced therein.

I claim:

1. A method of joining first and second shaft pieces together, comprising the steps of:
   attaching a pilot stub to an end surface of the first shaft piece;
   forming a pilot hole in an opposing end surface of the second shaft piece;
   positioning the first and second shaft pieces end to end with the pilot stub inside the pilot hole;
   forming a narrow groove in the region of the opposing end surfaces having a sufficient length, width and depth to substantially remove the opposing end surfaces without affecting the pilot stub or pilot hole;
   preheating the groove;
   filling the groove using a ferrous-based welding filler metal and a narrow groove welding technique; and
   postheating the filled groove.

2. The method of claim 1, wherein the welding filler metal includes about 1.75–2.75 weight percent chromium, about 0.6–1.4 weight percent molybdenum, and about 0.2–0.4 weight percent vanadium.

3. The method of claim 1, wherein the groove is preheated to a temperature of about 400° to about 600° F.

4. The method of claim 1, wherein the filled groove is postheated at a temperature of about 1100° F. to about 1300° F. for a period of about 4 to about 10 hours.

5. The method of claim 1, wherein the groove is formed to extend 360 degrees circumferentially around the rotor.

6. The method of claim 5, wherein the welding filler metal is deposited continuously in the groove circumferentially around the rotor, until the filler metal fills the groove.

7. The method of claim 1, wherein the groove is formed to have a floor and two side walls which rise at angles of about two to about three degrees from an imaginary center line which bisects the groove and which is perpendicular to the floor.

8. The method of claim 7, wherein the groove has a semi-trapezoidal cross-section.

9. The method of claim 2, wherein the welding filler metal includes about 2.0–2.5 weight percent chromium.

10. The method of claim 9, wherein the welding filler metal includes about 2.25 weight percent chromium.

11. The method of claim 2, wherein the welding filler metal includes about 0.8–1.2 weight percent molybdenum.

12. The method of claim 11, wherein the welding filler metal includes about 1.0 weight percent molybdenum.

13. The method of claim 2, wherein the welding filler metal includes about 0.25–0.35 weight percent vanadium.

14. The method of claim 13, wherein the welding filler metal includes about 0.3 weight percent vanadium.

15. The method of claim 1, wherein the welding filler metal further includes about 0.5–0.15 weight percent carbon, about 0.5–0.7 weight percent manganese, about 0.10–0.30 weight percent silicon, about 0.005–0.010 weight percent phosphorous, and about 0.001–0.005 weight percent sulfur, with the balance being substantially iron.

16. The method of claim 3, wherein the groove is preheated to a temperature of about 500° F.

17. The method of claim 1, wherein the narrow groove welding technique comprises an automatic gas tungsten arc welding process.

18. The method of claim 4, wherein the filled groove is postheated at a temperature of about 1200° F. for a period of at least about four hours.

19. A method of joining first and second shaft pieces together, comprising the steps of:
   aligning the shaft pieces with an end surface of the first shaft piece facing an opposing end surface of the second shaft piece;
   positioning the shaft pieces end to end;
   forming a narrow groove in the region of the opposing end surfaces;
   providing a ferrous-based welding filler metal which includes about 1.75–2.75 weight percent chromium, about 0.6–1.4 weight percent molybdenum, about 0.2–0.4 weight percent vanadium, about 0.05–0.15 weight percent carbon, about 0.5–0.7 weight percent manganese, about 0.10–0.30 weight percent silicon, about 0.005–0.010 weight percent phosphorous, about 0.001–0.005 weight percent sulfur, and a balance substantially of iron; and
   welding the welding filler metal into the groove using an automatic gas tungsten arc welding process, until the filler metal fills the groove.

20. The method of claim 19, wherein the groove is formed to extend 360 degrees circumferentially around the rotor.

21. The method of claim 20, wherein the filler metal is deposited continuously in the groove circumferentially around the rotor, until the filler metal fills the groove.

22. The method of claim 19, wherein the welding is performed using an interpass temperature of about 500°–700° F.

23. The method of claim 22, wherein the welding is performed using an interpass temperature of about 600° F.

24. The method of claim 19, wherein the welding is performed using a welding head travel speed of about 1–3 inches per minute.

25. The method of claim 24, wherein the welding is performed using a welding head travel speed of about 1.5–2.0 inches per minute.

26. The method of claim 19, wherein the welding is performed using a filler metal wire feed rate of about 18–22 inches per minute.

27. The method of claim 26, wherein the welding is performed using a filler metal wire feed rate of about 20 inches per minute.

28. The method of claim 19, wherein the welding is performed using a voltage of about 9–11 volts.

29. The method of claim 28, wherein the welding is performed using a voltage of about 9.5 volts.

30. The method of claim 19, wherein the welding is performed using current of about 240–250 amps at the sidewalls of the groove and about 140–150 amps between the sidewalls of the groove.

31. The method of claim 30, wherein the welding is performed using current of about 245 amps at the sidewalls of the groove and about 145 amps between the sidewalls of the groove.

32. A method of joining first and second shaft pieces together, comprising the steps of:

aligning the shaft pieces with an end surface of the first shaft piece facing an opposing end surface of the second shaft piece;

positioning the shaft pieces end to end;

forming a narrow grove in the region of the opposing end surfaces and extending 360 degrees circumferentially around the aligned shaft pieces;

providing a ferrous-based welding filler metal which includes about 1.75–2.75 weight percent chromium, about 0.6–1.4 weight percent molybdenum, and about 0.2–0.4 weight percent vanadium;

preheating the groove to a temperature of about 400° to about 600° F.;

depositing the welding filler metal continuously in the groove circumferentially around the rotor, until the filler metal fills the groove;

raising the temperature of the groove gradually until a post weld heat treatment temperature of about 1100° to about 1300° F. is reached;

maintaining the groove of the post weld heat treatment temperature for a period of about 4 to about 10 hours; and lowering the temperature of the groove gradually until the temperature falls below about 500° F.

33. The method of claim 32, wherein the temperature of the groove is raised at a rate of about 125° F. per hour until the post weld heat treatment temperature is reached.

34. The method of claim 32, wherein the temperature of the groove is lowered at a rate of about 125° F. per hour until the temperature falls below about 500° F.

35. The method of claim 32, wherein the post weld heat treatment temperature is about 1200° F.

36. The method of claim 32, further comprising the step of baking the groove at about 500°–600° F. after the filler metal has been deposited into the groove.

* * * * *